Figure 1:
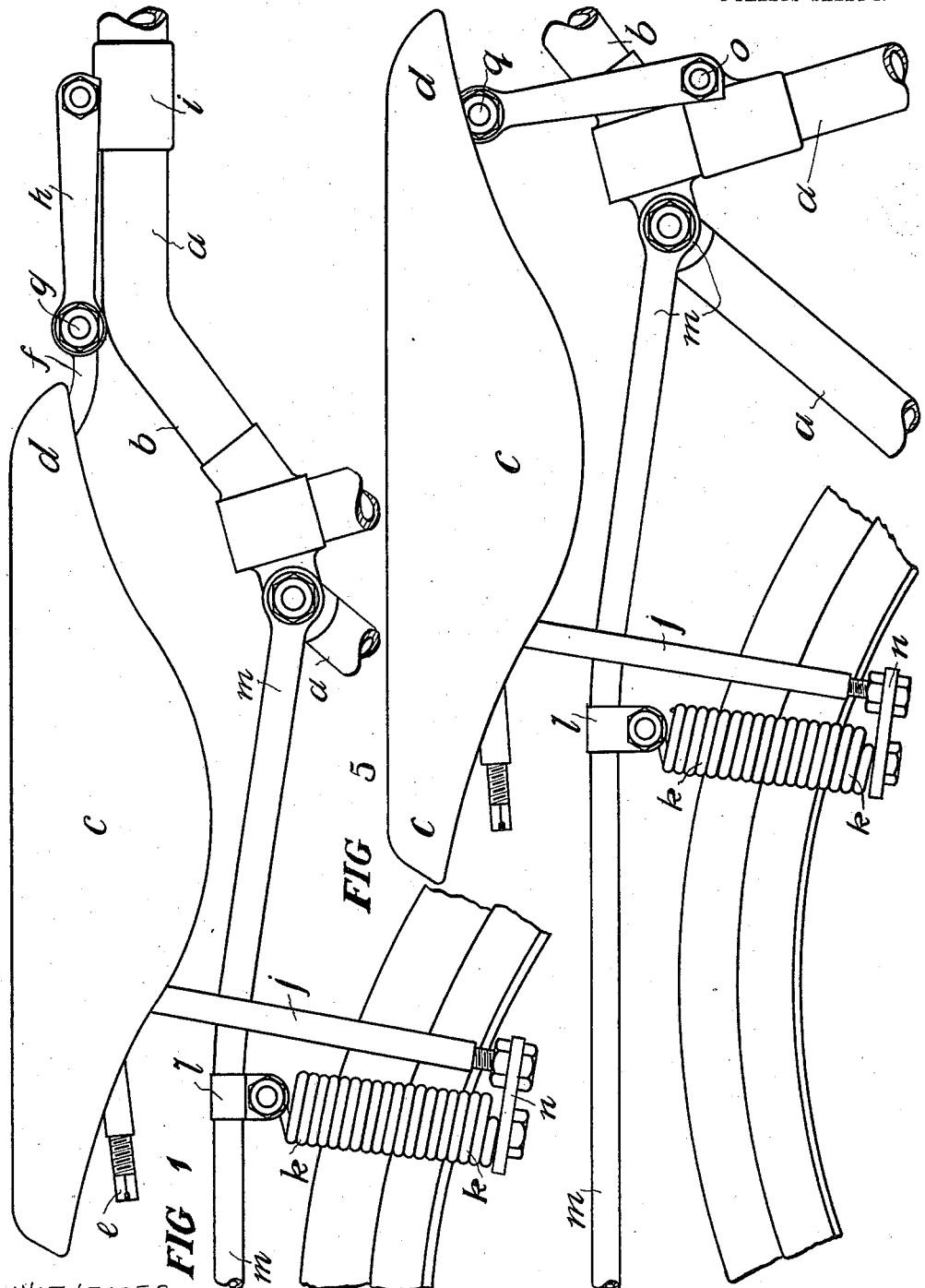

E. LYCETT.
SADDLE FOR CYCLES, MOTOR CYCLES, AND LIKE MACHINES.
APPLICATION FILED APR. 15, 1911.

1,023,744.

Patented Apr. 16, 1912.

4 SHEETS—SHEET 3.

WITNESSES:

INVENTOR,
EDWARD LYCETT,
by
Attorney.

E. LYCETT.
SADDLE FOR CYCLES, MOTOR CYCLES, AND LIKE MACHINES.
APPLICATION FILED APR. 15, 1911.

1,023,744.

Patented Apr. 16, 1912.

4 SHEETS—SHEET 4.

WITNESSES:

INVENTOR,
EDWARD LYCETT,
by
Attorney.

UNITED STATES PATENT OFFICE.

EDWARD LYCETT, OF OLTON, ENGLAND.

SADDLE FOR CYCLES, MOTOR-CYCLES, AND LIKE MACHINES.

1,023,744.

Specification of Letters Patent. Patented Apr. 16, 1912.

Application filed April 15, 1911. Serial No. 621,325.

*To all whom it may concern:*

Be it known that I, EDWARD LYCETT, a citizen of Great Britain, residing at St. Bernards Road, Olton, county of Warwick, England, manufacturer, have invented certain new and useful Improvements in a Saddle for Cycles, Motor-Cycles, and Like Machines; and I do hereby declare the following to be a full, clear, and exact description of the same.

This invention comprises improvements in and relating to saddles of cycles, motor cycles, and like machines and has more particular reference to saddles for motor cycles.

With motor cycles at the present time it is considered desirable to arrange the seat as low as possible upon the frame with a view to avoiding wind pressure and to give the rider greater security and control in travel. With this object it has been proposed to form the top frame tube with a downwardly inclined portion or slightly dropped part where it joins with the down tube in which the angle saddle pin or pillar is mounted. This enables the saddle to be brought to a level only slightly above the top frame tube.

In accordance with my invention I dispense with the usual saddle underframe to which is secured the attachment boss and upon which the usual spring devices are mounted and I mount the saddle direct onto the machine frame. For this purpose I provide a clip or other suitable suspension devices on the machine frame to which the pommel end of the saddle is hinged and I provide attachment clips or other suitable suspension devices on parts of the frame or carrier adjacent to the position it is desired the rear or cantle part of the saddle shall occupy and I mount flexible devices between the rear of the saddle and the attachment clips or suspension devices to give the desired spring mounting.

It is becoming customary to mount a strong carrier as a permanent fixture with the frame, and the strong side bars of such a carrier form convenient points for mounting the springs, compression or tension for supporting the rear of the saddle.

As the girder or other underframe of the saddle and its attachment boss and angle pillar are rendered unnecessary it is possible to arrange the saddle very much lower than hitherto. I further provide a much more flexible seat as the movement is not restricted by an underframe but has full play on the springs.

The improved saddle is cheaper to produce and is lighter for the same strength than ordinary saddles.

The front of the saddle is preferably hinged to a clip on the top tube of the frame or on the oblique down tube. The hinge may be arranged on an extension in front of the saddle or to the nose of the saddle itself. Preferably the hinge is arranged to prevent any lateral motion or rocking but is free to permit motion in a vertical plane.

The spring mounting for the rear of the saddle may comprise two thrust rods engaging the lower ends of tension coils whose upper ends are supported by clips to the carrier or other convenient part, or I may use any suitable spring mounting.

I may use tension springs from the cantle to the machine frame or I may use the known parallelogram spring motion either in addition to an ordinary spring suspension or without same as found desirable in practice.

In order that the invention may be thoroughly understood and easily carried into practice I have appended hereunto 4 sheets of drawings illustrating examples of same.

Figure 2:
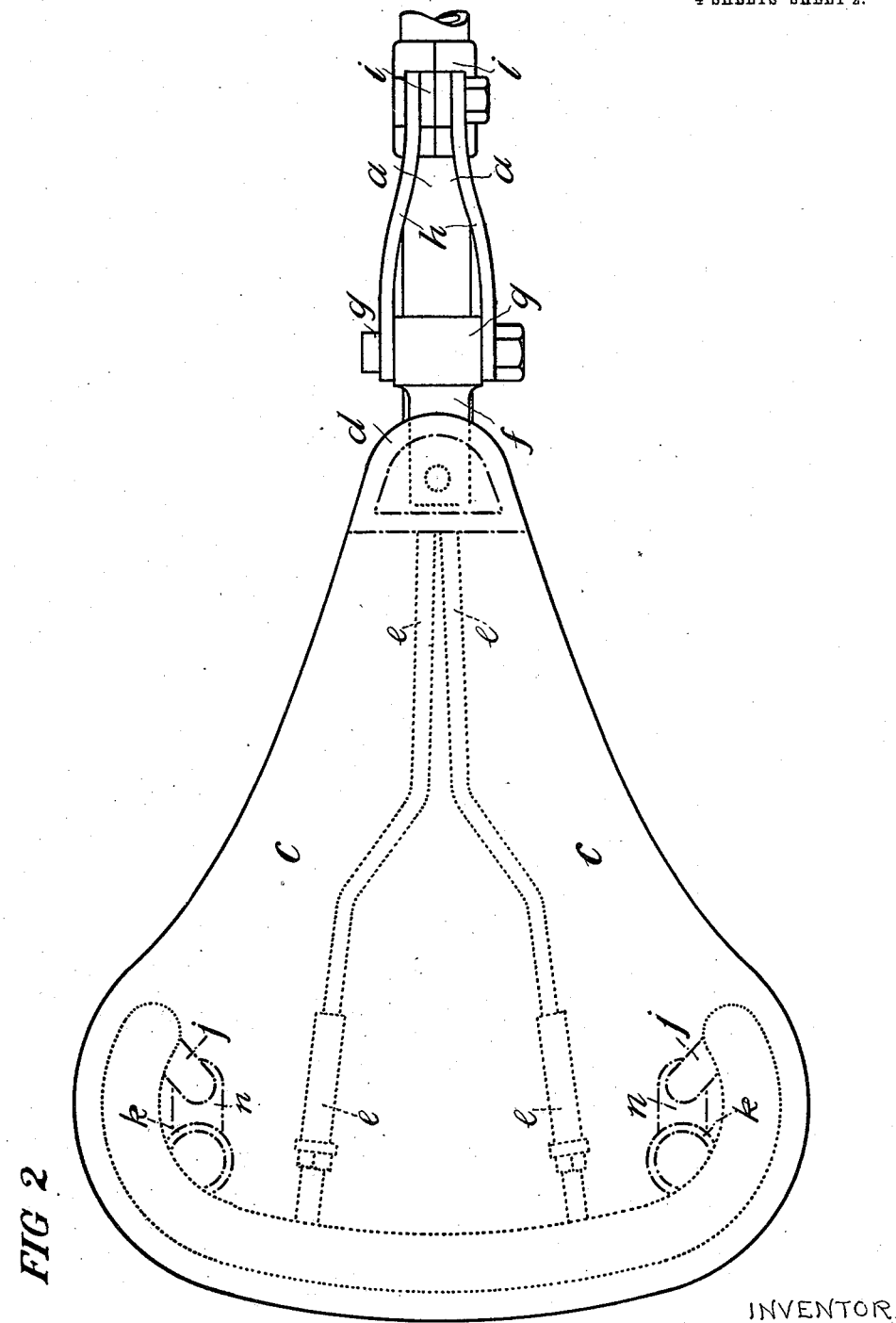
Figure 3:
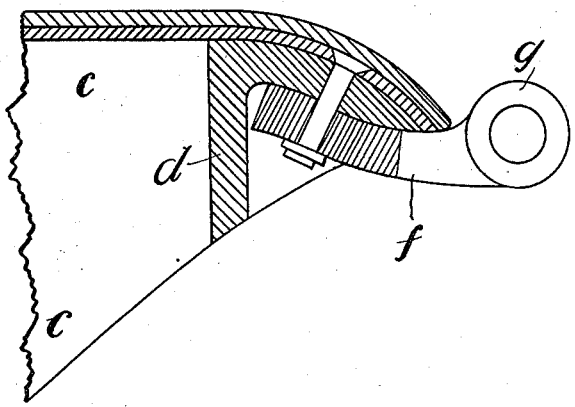
Figure 4:
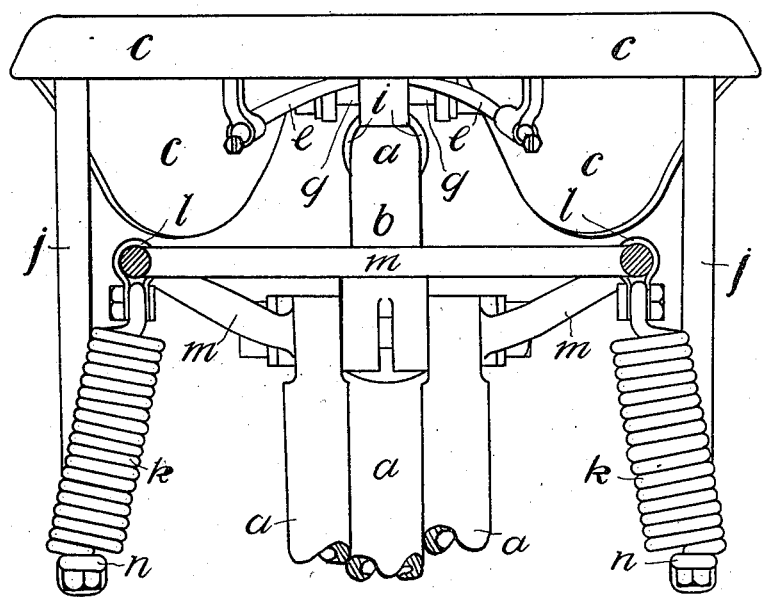
Figure 6:
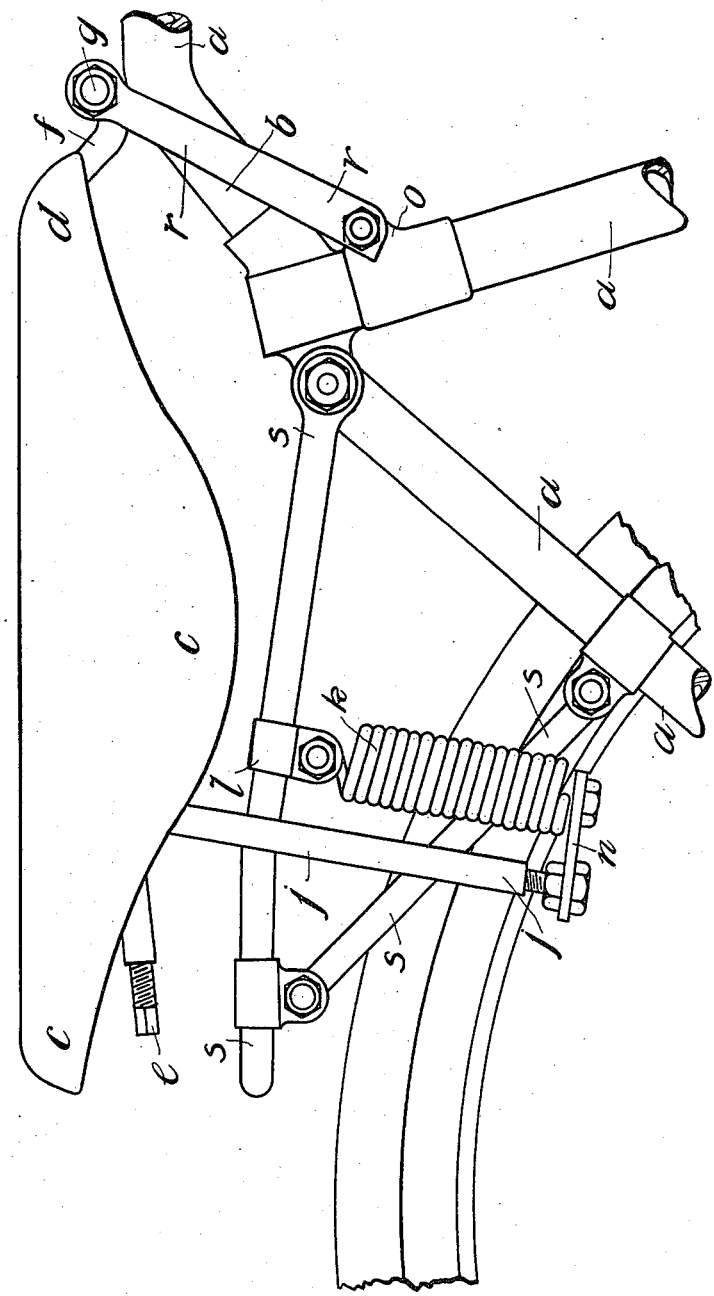

Figure 1 is an elevation of the rear upper part of a motor cycle frame with my invention applied. Fig. 2 is a plan of the connection at the nose of the saddle. Fig. 3 is a sectional elevation of the nose of the saddle and its connection. Fig. 4 is a rear elevation of the saddle. Fig. 5 is a similar view to Fig. 1 but showing a modified suspension of the saddle. Fig. 6 shows a further modification.

On these drawings *a* is the machine frame which may or may not have the dropped part *b*. The saddle comprises a cover *c* with cantle plate and nose *d* in the pommel and with suitable provisions for tensioning such as *e*. In place of the usual underframe carrying the attachment boss for an angle pin, I employ a hinge suspension from the nose to the frame and a suitable spring support between the back and a part carried by the frame. In Figs. 1 to 4 the suspension at the front comprises an attachment to the nose *d* forming a strap part *f* of a hinge *g*. The attachment *f* is preferably cranked upwardly as seen in Fig. 3 to bring the hinge in front of the saddle nose and in substantially the same plane therewith. The hinge pin is here shown supported by bars or a link h which is securely held by the clamping pin of a clip such as i to the frame tube and the sides of this link are spread as shown to provide a substantial bearing for the hinge so as to prevent any lateral play upon same. This link structure is not essential as the hinge may be supported by a clip immediately below it, but this arrangement here shown is convenient for the frame illustrated and permits the saddle being arranged as low as possible.

A flexible support for the rear of the saddle is formed by employing thrust rods j from the cantle to springs such as k, which are suspended by suitable clips l from the carrier m. The thrust bars and springs form a flexible supporting device which is well known in ordinary underframe saddles and I may substitute for it any other known supporting device which may suitably operate in combination with the flexible suspension of the saddle nose and which may be secured between the saddle and the machine frame itself or a carrier or bracket thereon.

It is convenient to provide angle bars n from the thrust rods j to connect with the springs for enabling the rods to be arranged to clear the carrier and stays of the frame and still obtain a substantially central pull upon the springs. The bars n may be adjusted upon threaded portions of the rods for adjusting the tension put upon the springs. Any well known device may be provided for adjusting the saddle forwardly and backwardly.

In Fig. 5 the saddle is shown supported by a clip o upon the down tube of the frame and the hinge q is formed below the nose of the saddle, being supported by a link r clamped to the clip o.

In Fig. 6 a special bracket s is shown upon the machine for attachment of the spring suspension device for the rear of the saddle. The hinge suspension at the front is very similar to that shown in Fig. 5 but may be the same as that shown in Fig. 1.

What I claim and desire to secure by Letters Patent then is:—

1. In saddles for cycles, motor cycles and the like, the combination of a frame, a saddle, links pivoted at one end to the forward end of the saddle and at the opposite end to said frame, and a spring supporting device connected to the frame and supporting the rear end of the saddle.

2. In saddles for cycles, motor cycles and the like, the combination of a frame, a saddle, links pivoted at one end to the forward end of the saddle and at the opposite end to said frame, and a spring supporting device connected to the frame and supporting the rear end of the saddle, said links being disposed in front of the saddle nose and in substantially the same horizontal plane therewith.

3. In saddles for cycles, motor cycles and the like machines, a hinge connection of the saddle nose to the machine frame, said hinge connection being disposed in front of the saddle nose and in substantially the same horizontal plane therewith, and a spring supporting device at the rear of said saddle connected to the carrier or frame.

4. In saddles for cycles, motor cycles and the like machines a hinge connection of the saddle nose to the machine frame, said hinge connection being disposed in front of the saddle nose and in substantially the same horizontal plane therewith, and a spring supporting device at the rear of said saddle connected to the carrier or frame or a bracket thereon, said spring device comprising thrust rods from the rear of the saddle distending tension springs connected to the frame.

5. In saddles for cycles, motor cycles and like machines a hinge connection of the saddle nose to the machine frame, said hinge connection being disposed in front of the saddle nose and in substantially the same horizontal plane therewith, and a spring supporting device at the rear of said saddle connected to the carrier or frame or a bracket thereon, said spring device comprising thrust rods from the rear of the saddle distending tension springs, said springs being hingedly connected at their upper end to the frame.

6. In saddles for cycles, motor cycles and like machines, a hinge connection of the saddle nose to the machine frame, said hinge connection being disposed in front of the saddle nose and in substantially the same horizontal plane therewith, and a spring supporting device at the rear of said saddle, said spring device comprising thrust rods projecting down from the rear of the saddle arranged to distend suitably mounted tension springs.

In testimony whereof I affix my signature in presence of two witnesses.

EDWARD LYCETT.

Witnesses:
F. GILBERT BRETTELL,
E. SIMS BRETTELL.

Copies of this patent may be obtained for five cents each, by addressing the "Commissioner of Patents, Washington, D. C."